United States Patent
Hung

(10) Patent No.: US 12,240,276 B2
(45) Date of Patent: Mar. 4, 2025

(54) PROGRAMMING SYSTEM, PROGRAMMING METHOD, AND PROGRAMMER FOR TIRE PRESSURE DETECTOR

(71) Applicant: MOBILETRON ELECTRONICS CO., LTD., Taichung (TW)

(72) Inventor: Wen-Chuan Hung, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 192 days.

(21) Appl. No.: 18/075,251

(22) Filed: Dec. 5, 2022

(65) Prior Publication Data

US 2023/0264526 A1 Aug. 24, 2023

(30) Foreign Application Priority Data

Feb. 23, 2022 (TW) .................................. 111106477

(51) Int. Cl.
*B60C 23/00* (2006.01)
*B60C 23/04* (2006.01)

(52) U.S. Cl.
CPC ...... *B60C 23/0479* (2013.01); *B60C 23/0461* (2013.01)

(58) Field of Classification Search
CPC ............ B60C 23/0479; B60C 23/0461; B60C 23/0471; B60C 23/0433; G06F 8/61
USPC ................. 340/447, 445, 442, 426.33, 425.5
See application file for complete search history.

(56) References Cited

U.S. PATENT DOCUMENTS

| 9,120,357 B2* | 9/2015 | Deniau ............... B60C 23/0471 |
| 2008/0117036 A1* | 5/2008 | Kenny ..................... H04Q 9/00 340/447 |
| 2014/0165026 A1* | 6/2014 | McIntyre .................. G06F 8/65 717/100 |
| 2022/0166453 A1* | 5/2022 | Cheng ................. B60C 23/0479 |

(Continued)

FOREIGN PATENT DOCUMENTS

| CN | 113554140 A | 10/2021 |
| TW | 201914843 A | 4/2019 |

(Continued)

OTHER PUBLICATIONS

Search Report for TW111106477, Issued on Jul. 20, 2022, Total of 1 page.

(Continued)

*Primary Examiner* — Anh V La
(74) *Attorney, Agent, or Firm* — Apex Juris, pllc; R. Lynette Wylie

(57) ABSTRACT

A programming system includes a mobile device and a programmer, in which the programmer includes a wireless communication module, a control module, and a communication module. A programming method of the programming system includes: storing a program code in the mobile device; establishing wireless communication between the control module and the mobile device via the wireless communication module to obtain the program code of the mobile device; and, sending the program code from the control module to a tire pressure detector via the communication module to program the program code whereby it is convenient for the user to operate and the manufacturing cost of the programmer can be reduced.

10 Claims, 9 Drawing Sheets

(56) References Cited

U.S. PATENT DOCUMENTS

2022/0253296 A1* 8/2022 Lin .................... B60C 23/0433

FOREIGN PATENT DOCUMENTS

TW       202042162 A    11/2020
TW       202141010 A    11/2021

OTHER PUBLICATIONS

Translation of Abstract of TW201914843, Total of 1 page.
Translation of Abstract of CN113554140, Total of 1 page.
Translation of Abstract of TW202141010, Total of 1 page.
Translation of Abstract of TW202042162, Total of 1 page.

* cited by examiner

PROGRAMMING SYSTEM, PROGRAMMING METHOD, AND PROGRAMMER FOR TIRE PRESSURE DETECTOR

BACKGROUND OF THE INVENTION

Technical Field

The present invention relates generally to a tire pressure detector, and more particularly to a programming system, a programming method, and a programmer for a tire pressure detector.

Description of Related Art

A tire pressure monitoring system (TPMS) is an electronic system for monitoring tire pressure, in which the TPMS includes a plurality of tire pressure detectors and a receiver. The tire pressure detectors are respectively installed in each of the tires while the receiver is installed in the vehicle. The tire pressure detected by the tire pressure detectors is wirelessly sent to the receiver to inform the driver of the condition of tire pressure in real-time.

The tire pressure detectors gradually become standard equipment in vehicles. However, the communication protocols used by the tire pressure monitoring system to transmit wireless signals vary from vehicle brand to vehicle brand. Even the tire pressure monitoring system of the same vehicle brand varies based on the car models or the time the cars leave the factory and, thus, different communication protocols are adopted accordingly. Therefore, all the tire pressure detectors need to be programmed with specific communication program codes through programmers so that the wireless signal sent by the tire pressure detector conforms to the communication protocol of the tire pressure monitoring system it belongs to.

When the tire pressure detector is to be replaced, the newly installed tire pressure detector needs to be programmed with the same communication program code so that the wireless signals conform to the original communication protocol. For those vendors who installed tire pressure detectors, the storage space of the programmer must be large enough to store communication program codes corresponding to various vehicle brands and models. As a result, the manufacturing cost of the programmer will increase accordingly.

BRIEF SUMMARY OF THE INVENTION

In view of the above, the primary objective of the present invention is to provide a programming system, a programming method, and a programmer so that a user can send the required program codes to the programmer by a mobile device, which is convenient for the user to operate and reduces the manufacturing cost of the programmer.

The present invention provides a programming system for sending a program code to a tire pressure detector to program the program code. The programming system includes a mobile device and a programmer. The mobile device stores and sends the program code. The programmer wirelessly communicates with the mobile device and the tire pressure detector, in which the programmer receives the program code and sends the program code to the tire pressure detector.

The present invention provides a programming method for sending a program code to a tire pressure detector to program the program code. The programming method includes the steps of:

providing a mobile device which stores the program code;
providing a programmer which wirelessly communicates with the mobile device;
establishing communication between the programmer and the tire pressure detector, and sending the program code from the programmer to the tire pressure detector.

In addition, the present invention further provides a programmer for receiving a program code from a mobile device and sending the program code to a tire pressure detector to program the program code. The programmer includes a wireless communication module, a control module, and a communication module. The wireless communication module wirelessly communicates with the mobile device to receive the program code. The control module is electrically connected to the wireless communication module and obtains the program code from the wireless communication module. The communication module is electrically connected to the control module and is signally connected to the tire pressure detector, in which the control module sends the program code to the tire pressure detector via the communication module.

The advantage of the present invention is that the user needs only the mobile device to select the program code to be programmed and to send the program code to the programmer, then the program code can be programmed to the tire pressure detector, which is convenient for the user to operate. And, the programmer needs only a small storage space to store the program code sent by the mobile device, which effectively reduces the manufacturing cost of the programmer.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Figure 1:
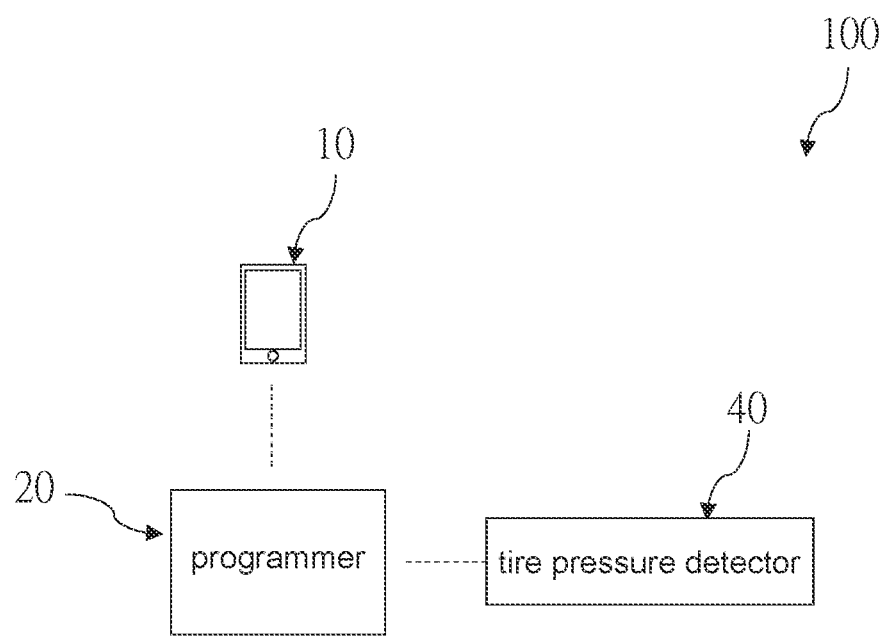
FIG. 1 is a schematic view of a programming system of a first preferred embodiment according to the present invention.
Figure 2:
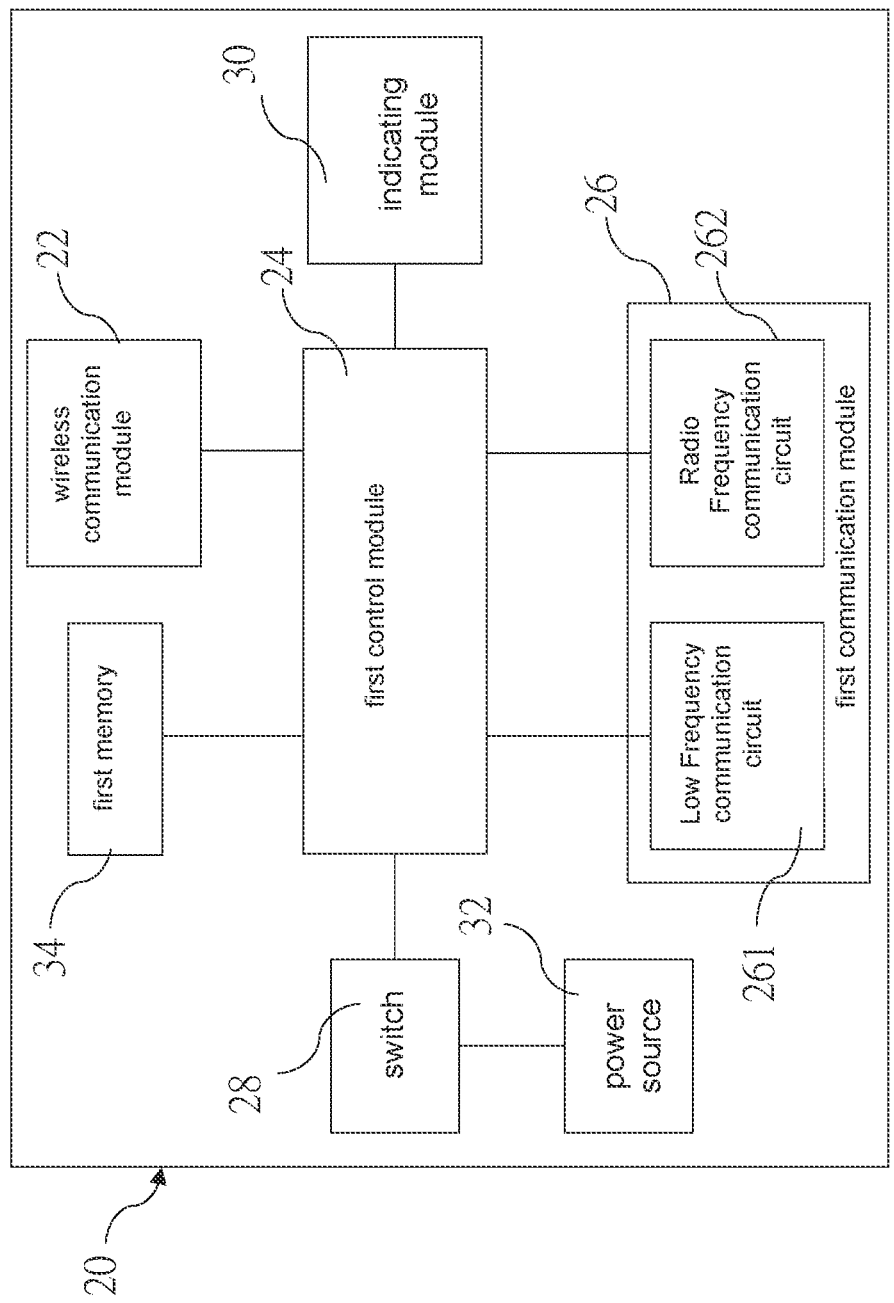
FIG. 2 is a block diagram of a programmer of the first preferred embodiment.
Figure 3:
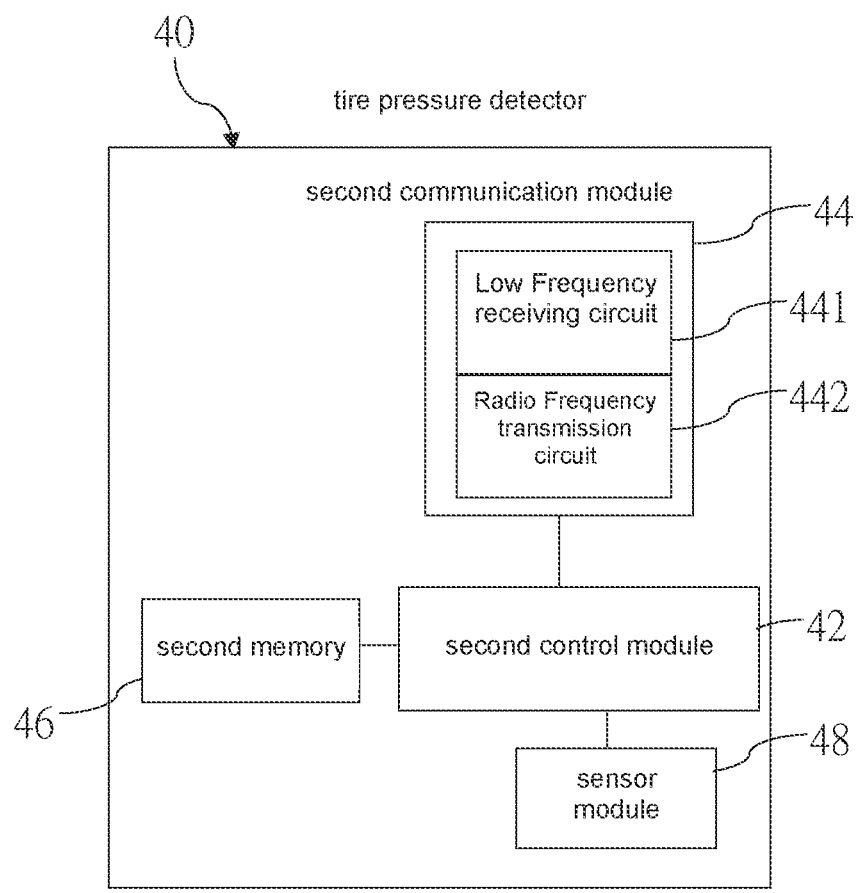
FIG. 3 is a block diagram of a tire pressure detector of the first preferred embodiment.

A programming system 100 of a first preferred embodiment according to the present invention is shown in FIG. 1 to FIG. 3, in which the programming system 100 is for sending a program code to a tire pressure detector 40 to program the program code. The programming system 100 includes a mobile device 10 and a programmer 20.

The mobile device 10, such as a smartphone or a tablet, stores at least one program code corresponding to a tire pressure monitoring system (TPMS). In practice, the mobile device 10 can store a plurality of program codes respectively corresponding to different tire pressure monitoring systems (TPMS). The mobile device 10 is for executing an application program to display an operation interface on a screen of the mobile device, in which the user operates the operation interface to select a program code, and a wireless communication module of the mobile device 10 wirelessly communicates with the programmer 20. In the current embodiment, the communication is performed through a Bluetooth signal.

As shown in FIG. 2, the programmer 20 includes a wireless communication module 22, a control module which is a first control module 24 as an example, and a communication module which is a first communication module 26 as an example. The wireless communication module 22 is for wirelessly communicating with the mobile device 10. In the current embodiment, the wireless communication module 22 is a Bluetooth communication module. The first control module 24 is electrically connected to the wireless communication module 22 and the first communication module 26. The first control module 24 receives data from the mobile device 10 via the wireless communication module 22 and transmits data to the mobile device 10. The first control module 24 may be a microcontroller. The first communication module 26 is signally connected to the tire pressure detector 40, in which the first communication module 26 is wirelessly connected to the tire pressure detector 40 in the current embodiment. More specifically, the first communication module 26 includes a Low-Frequency communication circuit 261 (LF communication circuit) and a Radio Frequency communication circuit 262 communication circuit). The Low-Frequency communication circuit 261 is for sending low-frequency signals, such as 125 kHz low-frequency signals, while the Radio Frequency communication circuit 262 is for receiving or sending radio frequency signals, such as 315 MHz or 433 MHz radio-frequency signals.

In the current embodiment, the programmer 20 further includes a switch 28 and an indicating module 30, in which the switch 28 and the indicating module 30 are electrically connected to the first control module 24. The switch 28 is connected to a power source 32 and is operated by the user to switch on or off the power source 32. When the switch 28 is on, the power source 32 supplies power for the programmer 20 to run, in which the power source 32 can be a battery or an external DC power source. When the switch 28 is off, the programmer 20 is turned off or in sleep mode.

The first control module 24 controls the indicating module 30 to generate an indication. In the current embodiment, the indicating module 30 includes at least one light emitting diode to generate visual indications, such as on, off, or flashing. In another embodiment, the indicating module 30 may also include a sound component to generate hearing indications, such as sound of alarm.

In addition, the programmer 20 further includes a first memory 34 which is electrically connected to the first control module 24 for the first control module 24 to store data. The first memory 34 may also be built in the first control module 24.

The tire pressure detector 40 includes a second control module 42, a second communication module 44 electrically connected to the second control module 42, and a sensor module 48 electrically connected to the second control module 42. The second control module 42 can be a microcontroller. The second communication module 44 includes a Low Frequency receiving circuit 441 and a Radio Frequency transmission circuit 442. The Low-Frequency communication circuit 441 is for communicating with the Low-Frequency communication circuit 261 of the programmer 20 while the Radio Frequency transmission circuit 442 is for communicating with the Radio Frequency communication circuit 262 of the programmer 20.

The second memory 46 stores an identification code and can store a program code. The second memory 46 can also be built in the second control module 42.

The sensor module 48 at least includes a pressure sensor module which is for sensing tire pressure of a tire, but not limited thereto. The sensor module 48 can further include other sensing components, such as a temperature sensing component, a speed sensing element, and an acceleration sensing component.

The second control module 42 executes the program code of the second memory 46 to activate the sensor module 48 to obtain tire pressure of tires or other sensing data, such as tire temperature, speed, acceleration, and other information of tire condition. The program code executed by the second control module 42 further includes a communication protocol. After the second control module 42 encodes the tire condition according to the communication protocol, the Radio Frequency transmission circuit 442 of the second communication module 44 sends the encoded tire condition to a receiver of the tire pressure monitoring system so that the tire pressure detector 40 can communicate with the receiver and send the detected tire condition to the receiver.

Figure 4:
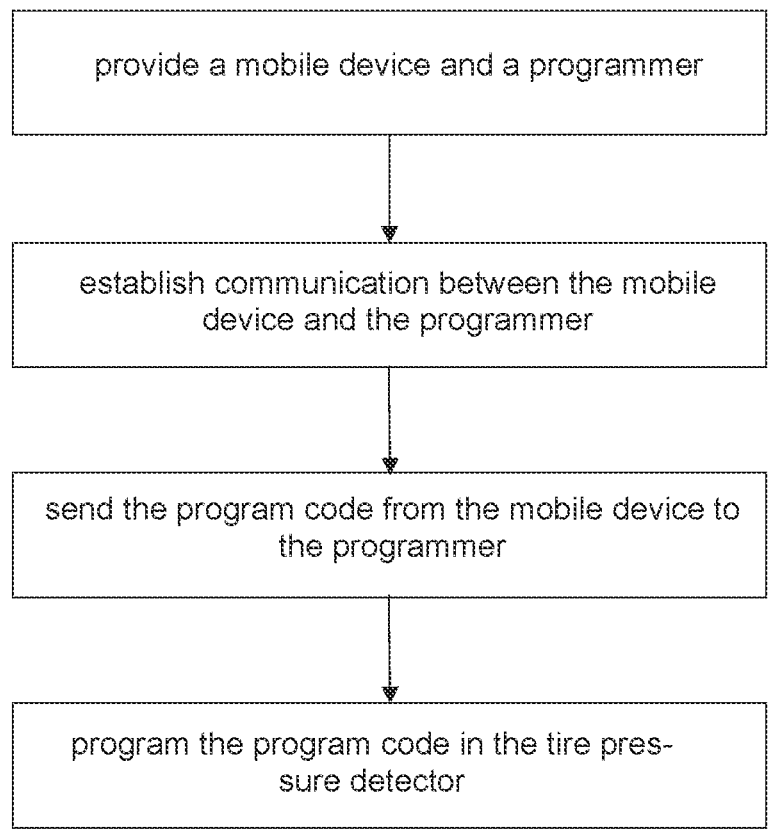
FIG. 4 is a flow chart of a programming method of the first preferred embodiment.

With the above-mentioned architecture, a programming method of the current embodiment can be performed, in which the programming method includes the following steps as shown in FIG. 4.

Provide the mobile device 10 which stores at least one program code to be programmed.

Provide the programmer 20 and establish communication between the programmer 20 and the mobile device 10. The programmer 20 is placed near the tire pressure detector 40 to establish communication between the programmer 20 and the tire pressure detector 40. In the current embodiment, the user operates the mobile device 10 to execute the application program to display the operation interface on the screen. After the user selects the program code to be programmed in the operation interface and chooses to start programming, the following steps can be performed.

Send the program code from the mobile device 10 to the programmer 20. In the current embodiment, after the wireless communication module 22 of the programmer 20 receives the program code, the first control module 24 stores the program code in the first memory 34.

Establish communication between the programmer 20 and the tire pressure detector 40 and send the program code to the tire pressure detector 40 to program the program code. In the current embodiment, the first control module 24 sends a programming command to the tire pressure detector 40 via the Low-Frequency communication circuit 261. After the Low Frequency receiving circuit 441 of the second communication module 44 of the tire pressure detector 40 receives the programming command and sends the programming command to the second control module 42, the second control module 42 enters a state of waiting for being programmed to wait for receiving the program code, and the second control module 42 sends a response message via the Radio Frequency transmission circuit 442 of the second communication module 44. Then, the Radio Frequency communication circuit 262 of the first communication module 26 of the programmer 20 receives the response message and sends the response message to the first control module 24. After the first control module 24 receives the response message, it can be determined that the tire pressure detector 40 is ready to receive the program code and the first control module 24 sends the program code to the tire pressure detector 40 via the Low-Frequency communication circuit 261.

After the Low-Frequency communication circuit 441 of the tire pressure detector 40 receives the program code, the second control module 42 writes the program code into the second memory 46 to complete the programming of the program code and sends a programming-completed message to the programmer 20 via the Radio Frequency transmission circuit 442. The Radio Frequency communication circuit 262 of the programmer 20 receives the programming-completed message and sends the programming-completed message to the first control module 24. After the first control module 24 receives the programming-completed message, it can be determined that the tire pressure detector 40 has completed the programming of the program code. The first control module 24 controls the indicating module 30 to generate an indication, for example, to control the light emitting diode to remain on, to inform the user that the tire pressure detector 40 has completed the programming of the program code.

In addition, after receiving the programming-completed message, the first control module 24 sends the programming-completed message to the mobile device 10 via the wireless communication module 22. On the screen, the mobile device 10 displays a completion message in response to the programming-completed message, and the user is informed from the screen of the mobile device 10 that the programming has been completed.

In this way, through the convenience of the portability and manipulation of the mobile device 10, the program code to be programmed is selected and sent to the programmer 20 so as to program the program code to the tire pressure detector 40. As a result, the first memory 34 of the programmer 20 does not need a large storage space to store a large number of program codes corresponding to the tire pressure detectors 40 of many different tire pressure monitoring systems. In other words, the programmer 20 needs only a small storage space to store the program code sent by the mobile device 10, which effectively reduces the manufacturing cost of the programmer 20. In addition, if a new program code is available for the tire pressure detector 40, the new program code can be sent to the programmer 20 through the above-mentioned programming method after the mobile device 10 downloads the new program code, and then the programmer 20 sends the new program code to the tire pressure detector 40 to update the original program code.

Figure 5:
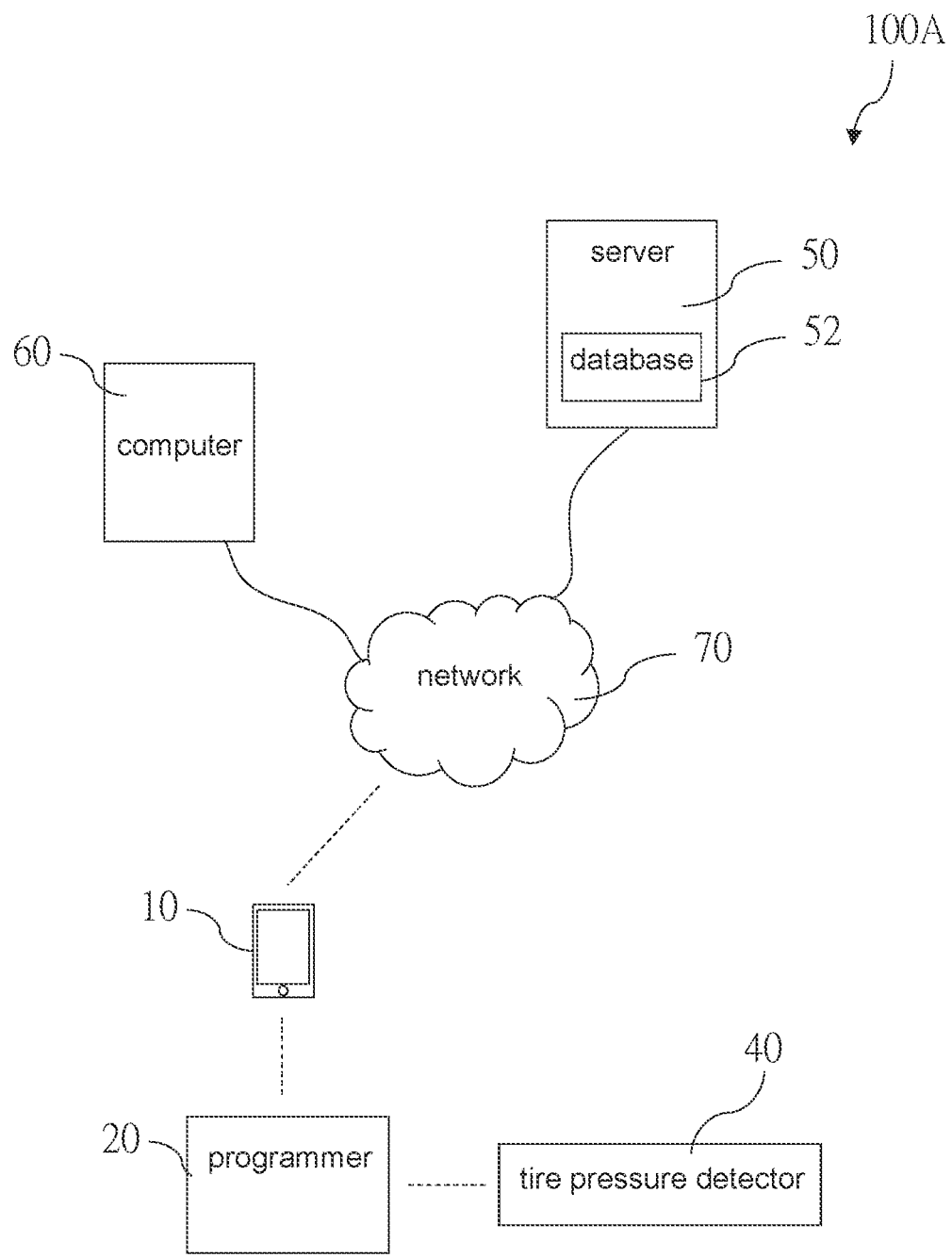
FIG. 5 is a schematic view of a programming system of a second preferred embodiment.

A programming system 100A of a second preferred embodiment according to the present invention is shown in FIG. 5, wherein the programming system 100A is based on the structure of the first preferred embodiment and further includes a server 50.

Figure 6:
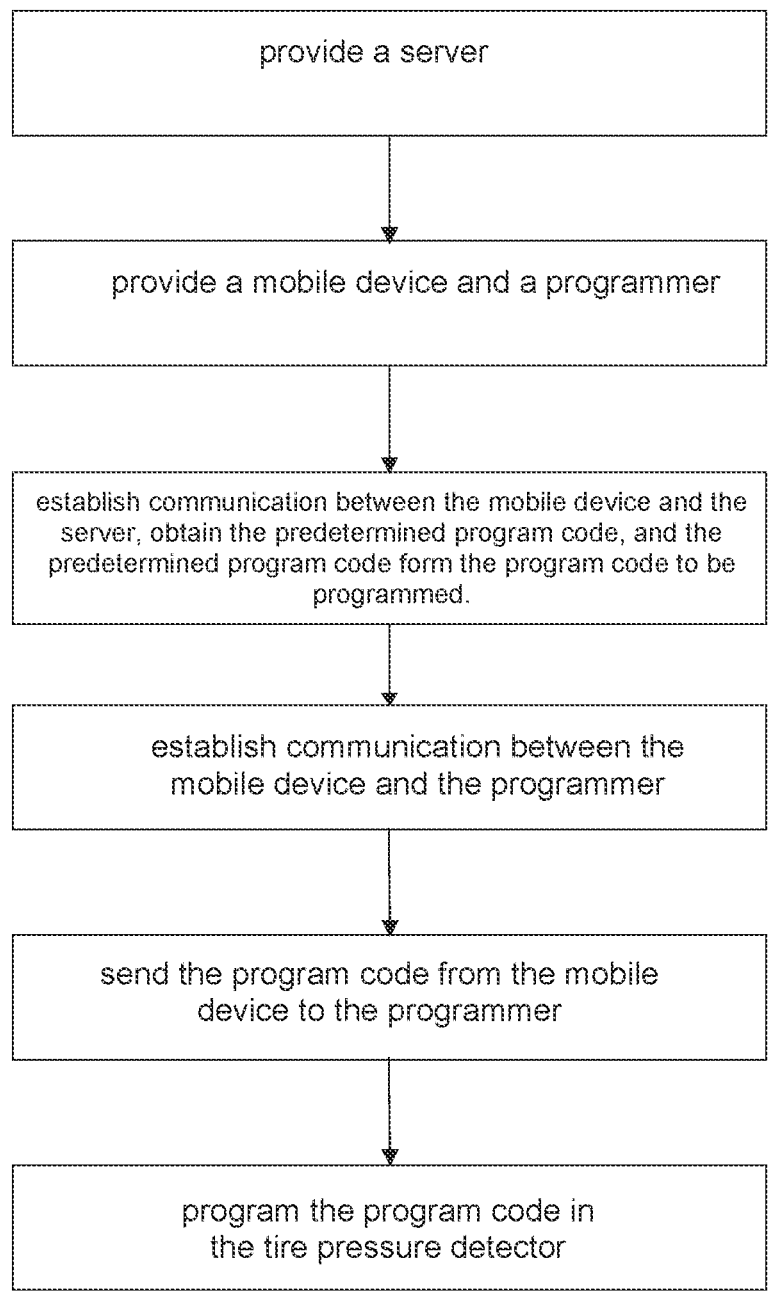
FIG. 6 is a flow chart of a programming method of the second preferred embodiment.

A programming method of the current embodiment is shown in FIG. 6 and has similar steps as the programming method of the first preferred embodiment, except that a manufacturer can upload at least one predetermined program code corresponding to at least one tire pressure monitoring system in advance through a computer 60 and store the at least one predetermined program code in a database 52 of the server 50, and the at least one predetermined program code of the database 52 can be updated to the latest version in real-time. A plurality of predetermined program codes is illustrated hereinafter as an example. More specifically, the manufacturer uploads a plurality of predetermined program codes corresponding to various tire pressure monitoring systems and stores the plurality of predetermined program codes in the database 52 of the server 50, and the plurality of the predetermined program codes of the database 52 can be updated to the latest version in real-time.

With the communication via a network 70, the user can select and download one of the plurality of predetermined program codes required for the current programming from the database 52 of the server, in which the obtained predetermined program code forms the program code stored in the mobile device 10. The subsequent steps are the same as those in the first preferred embodiment, which will not be repeated hereafter. In practice, it is possible to select a plurality of the required predetermined program codes.

The server 50 can also record the information of the predetermined program code obtained by the mobile device 10. If the server 50 finds that the predetermined program code obtained by the mobile device 10 has an updated version, the server 50 will send a notification to the mobile device 10 to notify that there is a new predetermined program code. The mobile device 10 can communicate with the server 50 via the network 70 to obtain the updated predetermined program code in real-time. The obtained updated predetermined program code forms the new program code which is sent to the programmer 20 and then sent to the tire pressure detector 40 by the programmer to be programmed. In this way, the user is ensured to be informed that there is a new program code.

In the current embodiment, the tire pressure detector 40 sends a programming-completed message to the programmer 20 after the programming of the program code is completed. The first control module 24 of the programmer 20 further sends the programming-completed message to the mobile device 10 via the wireless communication module 22 after receiving the programming-completed message. Then, the mobile device 10 deletes the programming-completed program code to save the storage space of the mobile device 10. For example, the mobile device 10 displays a confirmation option on the screen to ask the user whether to delete the programming-completed program code. After the user selects to confirm the deletion, the mobile device 10 deletes the programming-completed program code.

Figure 7:
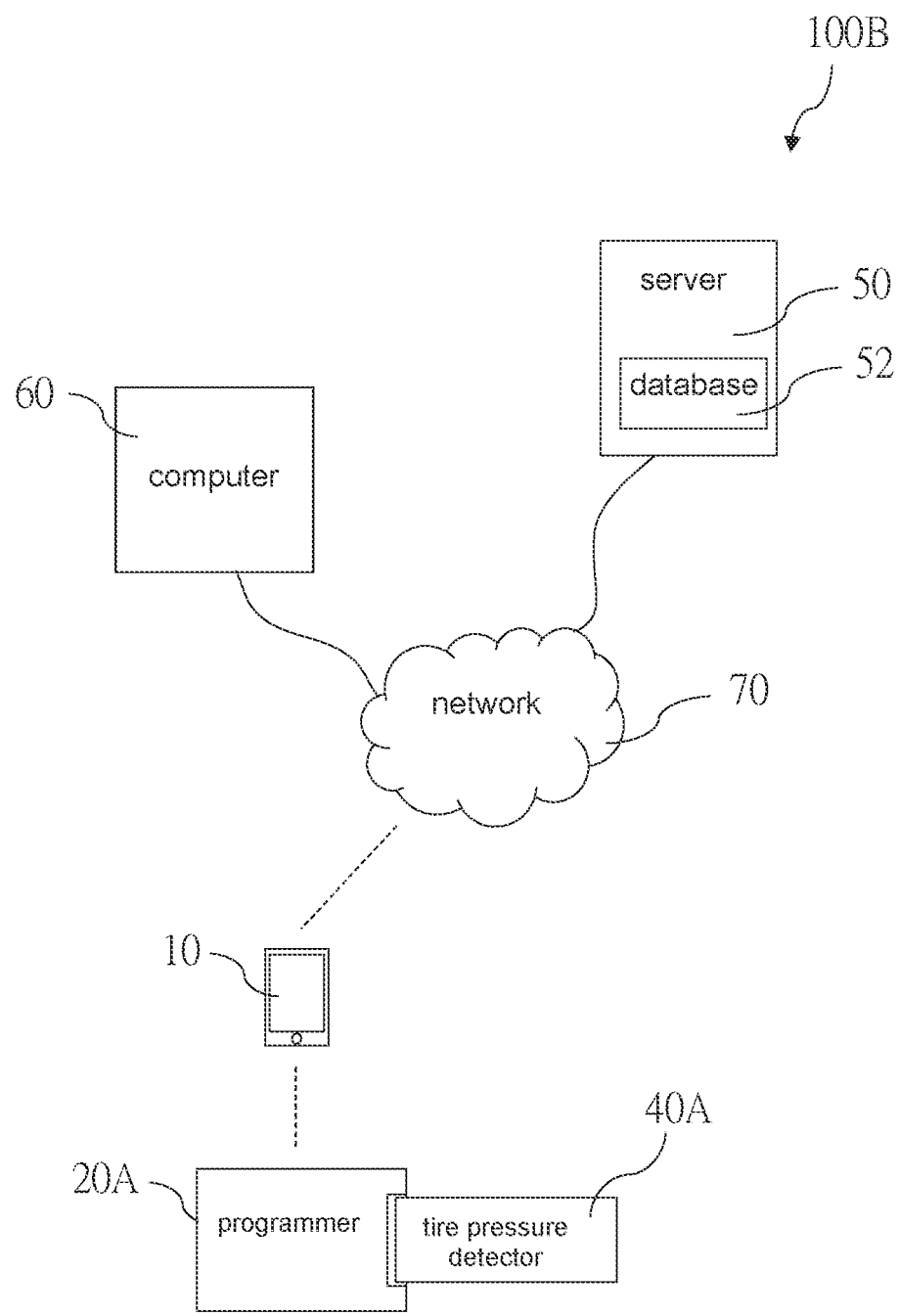
FIG. 7 is a schematic view of a programming system of a third preferred embodiment.

A programming system 100B of a third preferred embodiment according to the present invention is shown in FIG. 7, wherein the programming system 100B has a similar structure as the programming system 100A of the second preferred embodiment, except that the programmer 20A communicates with a tire pressure detector 40A and transmits a program code through a wired connection.

Figure 8:
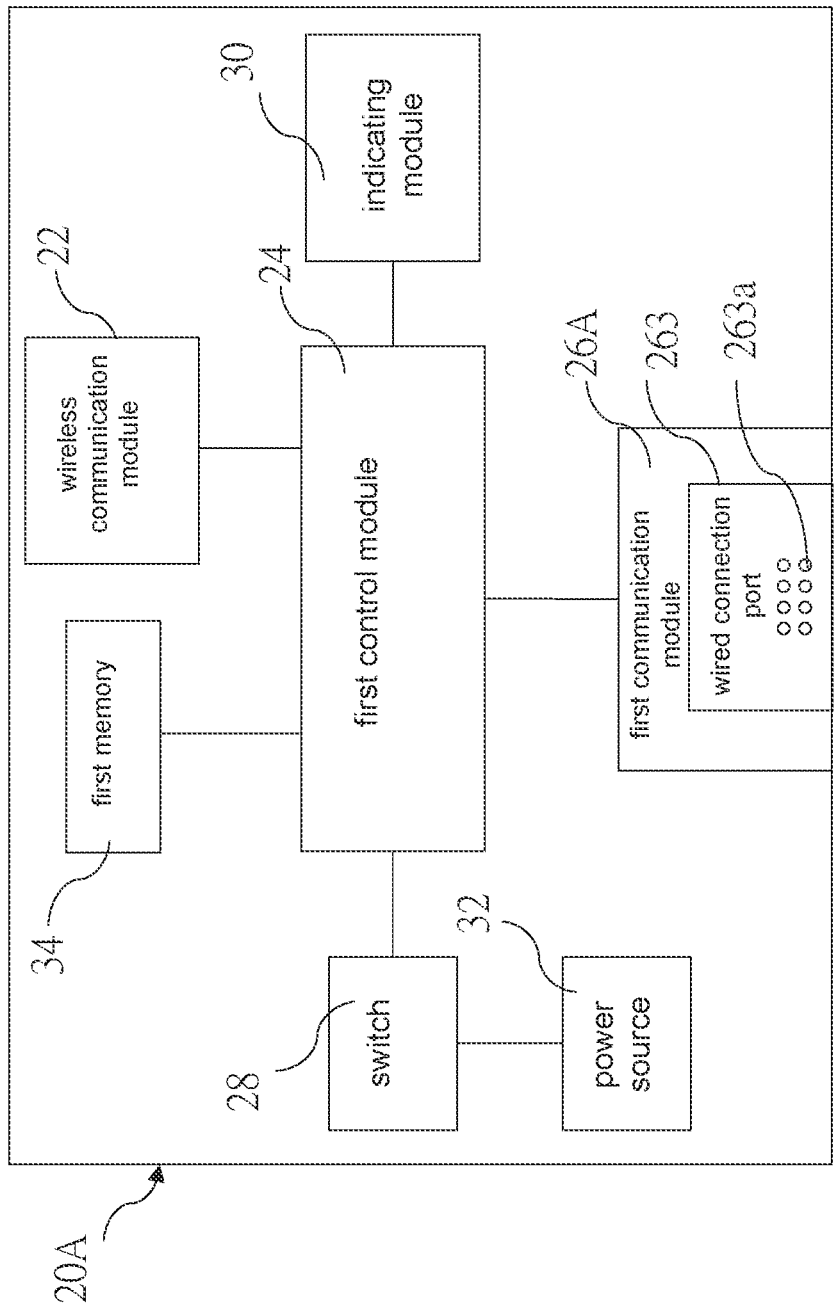
FIG. 8 is a block diagram of a programmer of the third preferred embodiment.

More specifically, the programmer 20A of the current embodiment is shown in FIG. 8 has a similar structure as the programmer 20 of the first preferred embodiment, except that the first communication module 26A of the programmer 20A is not provided with a Low-Frequency communication circuit 261 and a Radio Frequency communication circuit 262 but has a wired connection port 263. The wired connection port 263 includes a plurality of programming terminals 263a for respectively connecting a plurality of programming terminals (not shown) of the second communication module 44 of the tire pressure detector 40A so as to communicate with and send the program code to the tire pressure detector 40A to program the program code.

Figure 9:
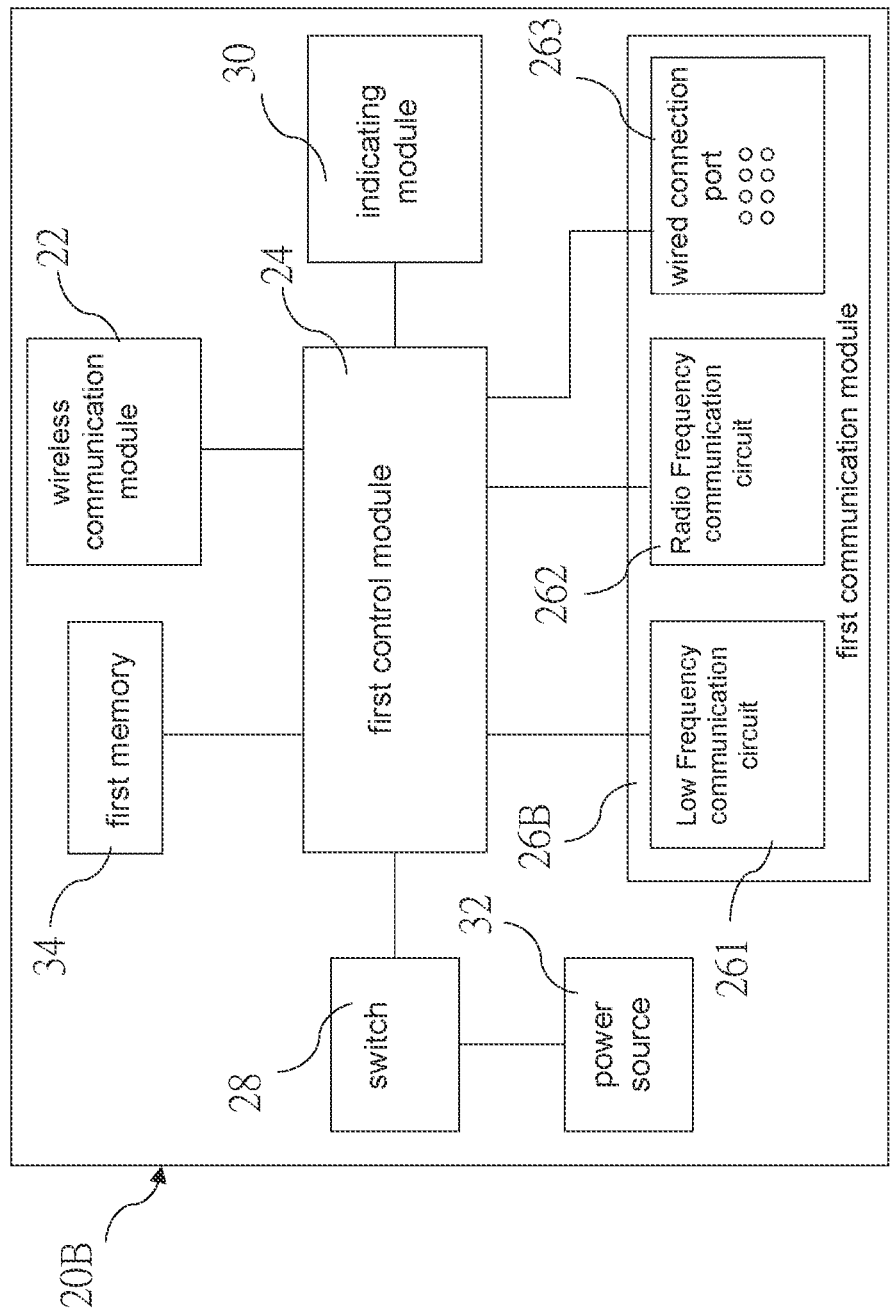
FIG. 9 is a block diagram of a programmer of a fourth preferred embodiment.

A programmer 20B of a fourth preferred embodiment according to the present invention is shown in FIG. 9, wherein the programmer 20B is based on the programmer 20 of the first preferred embodiment, and the first communication module 26B further includes the same wired connection port 263 as in the third preferred embodiment. In this way, the programmer 20B can selectively communicate with and send the program code to the tire pressure detector 40 via the Low-Frequency communication circuit 261 and the Radio Frequency communication circuit 262, or communicate with and send the program code to the tire pressure detector 40 via the wired connection port 263.

The programmer 20A of the third preferred embodiment and the programmer 20B of the fourth preferred embodiment can also be applied to the programming system 100 of the first preferred embodiment.

In sum, with the programming system, the programming method, and the programmer of the present invention, the user only needs to use the mobile device to select the program code to be programmed and send the program code to the programmer, and then the programmer can send the program code to the tire pressure detector for programming. Not only is it easy and convenient to operate, but a large storage space is not required in the programmer, which effectively reduces the manufacturing cost of the programmer.

It must be pointed out that the embodiments described above are only some embodiments of the present invention. All equivalent structures which employ the concepts disclosed in this specification and the appended claims are intended to be within the scope of the present invention.

What is claimed is:

1. A programming system for sending a program code to a tire pressure detector to program the program code, comprising:
    a mobile device which stores and sends the program code;
    a programmer wirelessly communicating with the mobile device and the tire pressure detector, in which the programmer receives the program code and sends the program code to the tire pressure detector;
    a server for storing at least one predetermined program code, wherein the mobile device communicates with the server via a network and obtains the at least one predetermined program code from the server, in which the obtained at least one predetermined program code forms the program code;
    wherein the server records the at least one predetermined program code which is obtained by the mobile device; the server sends a notification to the mobile device after the recorded at least one predetermined program code is updated; the mobile device communicates with the server via the network and obtains the updated at least one predetermined program code from the server, in which the updated at least one predetermined program code forms the new program code; the mobile device sends the new program code to the programmer, then the programmer sends the new program code to the tire pressure detector.

2. The programming system in claim 1, wherein the at least one predetermined program code stored by the server includes a plurality of predetermined program codes; the mobile device obtains at least one of the plurality of predetermined program codes from the server, in which the obtained at least one predetermined program code forms the program code.

3. The programming system in claim 1, wherein the programmer sends a programming command to the tire pressure detector, and after the programmer receives a response message sent by the tire pressure detector, the programmer sends the program code to the tire pressure detector.

4. The programming system in claim 3, wherein the programmer includes a Low-Frequency communication circuit and a Radio Frequency communication circuit; the programmer sends the programming command and the program code to the tire pressure detector through the Low-Frequency communication circuit and receives the response message through the Radio Frequency communication circuit.

5. The programming system in claim 1, wherein the programmer includes a communication module having a plurality of programming terminals for respectively connecting a plurality of programming terminals of the tire pressure detector so as to send the program code to the tire pressure detector.

6. The programming system in claim 1, wherein after the programmer receives a programming-completed message sent by the tire pressure detector, the programmer sends the programming-completed message to the mobile device; the mobile device has a screen, in which the mobile device displays a completion message on the screen in response to the programming-completed message.

7. A programming method for sending a program code to a tire pressure detector to program the program code, wherein the programming method comprises the steps of:
    providing a mobile device which stores the program code;
    providing a programmer which wirelessly communicates with the mobile device;
    sending the program code from the mobile device to the programmer; and
    establishing communication between the programmer and the tire pressure detector, and sending the program code from the programmer to the tire pressure detector;
    wherein the programming method comprising the steps of providing a server which stores at least one predetermined program code, wherein the mobile device communicates with the server via a network and obtains the at least one predetermined program code from the server, in which the obtained at least one predetermined program code forms the program code;
    wherein the programming method further comprising the steps of:
    recording the at least one predetermined program code obtained by the mobile device at the server;
    sending a notification from the server to the mobile device after the recorded at least one predetermined program code is updated;
    establishing communication between the mobile device and the server via the network, and obtaining the updated at least one predetermined program code at the server by the mobile device, in which the updated at least one predetermined program code forms the new program code;
    sending the new program code from the mobile device to the programmer; and
    sending the new program code from the programmer to the tire pressure detector.

8. The programming method in claim 7, wherein the at least one predetermined program code stored by the server includes a plurality of predetermined program codes; the mobile device obtains one of the plurality of predetermined program codes from the server, in which the obtained at least one predetermined program code forms the program code.

9. The programming method in claim 7, wherein the programmer sends a programming command to the tire pressure detector before sending the program code to the tire pressure detector; after the programmer receives a response message sent by the tire pressure detector, the programmer sends the program code to the tire pressure detector.

10. The programming method in claim 7, further comprising the steps of:
- receiving a programming-completed message sent from the tire pressure detector to the programmer, and then sending the programming-completed message from the programmer to the mobile device; and
- displaying a completion message on a screen of the mobile device in response to the programming-completed message.

* * * * *